US008219906B2

(12) United States Patent
Arav

(10) Patent No.: US 8,219,906 B2
(45) Date of Patent: *Jul. 10, 2012

(54) INSTANTANEOUS SYMBOL LOOKUP

(75) Inventor: Gal Arav, Bedford, MA (US)

(73) Assignee: Boadin Technology, LLC, Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/099,345

(22) Filed: May 2, 2011

(65) Prior Publication Data
US 2011/0209054 A1 Aug. 25, 2011

Related U.S. Application Data

(63) Continuation of application No. 12/435,296, filed on May 4, 2009, now Pat. No. 8,180,829, which is a continuation of application No. 11/384,957, filed on Mar. 20, 2006, now Pat. No. 7,529,795.

(51) Int. Cl.
G06F 17/25 (2006.01)
G06F 17/26 (2006.01)
(52) U.S. Cl. ...................................................... 715/261
(58) Field of Classification Search ................... 715/261
See application file for complete search history.

(56) References Cited

U.S. PATENT DOCUMENTS

| 4,356,589 A | 11/1982 | Mealing et al. ............. 15/320 |
| 5,754,176 A | 5/1998 | Crawford ..................... 345/338 |
| 5,854,630 A | 12/1998 | Nielsen ......................... 345/352 |
| 6,065,051 A | 5/2000 | Steele et al. ................. 709/219 |
| 6,199,077 B1 | 3/2001 | Inala et al. .................... 707/501 |
| 6,199,157 B1 | 3/2001 | Dov et al. ......................... 713/1 |
| 6,208,339 B1 | 3/2001 | Atlas et al. ................... 715/780 |
| 6,216,141 B1 | 4/2001 | Straub et al. ................. 707/513 |

(Continued)

FOREIGN PATENT DOCUMENTS
WO WO 02/03243 A1 1/2002
(Continued)

OTHER PUBLICATIONS

Chein, Andrew A., Concurrent Aggregates: Using Multiple-Access Data Abstractions to Manage Complexity in Concurrent Programs:, ACM,1990, pp. 31-36.*

(Continued)

*Primary Examiner* — Doug Hutton, Jr.
*Assistant Examiner* — James Debrow
(74) *Attorney, Agent, or Firm* — Patrick E. Caldwell, Esq.; The Caldwell Firm, LLC

(57) ABSTRACT

A computer program assists in the completion of text input provided by a user. For example, the computer program may maintain a list of n-tuples (where n>1), each of which includes n text strings. For example, each n-tuple may include a stock ticker symbol and the name of a company having that stock ticker symbol. As the user types each character, the program determines whether the text typed by the user so far matches any of the text strings in the n-tuples. The program provides the user with an indication of whether any matches have been found, such as by displaying a list of the n-tuples having text matching the text typed by the user so far. The program then allows the user to select one of the matching n-tuples. The program uses text (such as a stock ticker symbol) from the user's selection to complete the text input.

6 Claims, 8 Drawing Sheets

U.S. PATENT DOCUMENTS

| | | | | |
|---|---|---|---|---|
| 6,253,325 B1 | 6/2001 | Steele et al. | | 713/201 |
| 6,282,548 B1 | 8/2001 | Burner et al. | | 707/104 |
| 6,314,458 B1 | 11/2001 | Steele et al. | | 709/219 |
| 6,336,133 B1 | 1/2002 | Morris et al. | | 709/204 |
| 6,393,468 B1 | 5/2002 | McGee | | 709/218 |
| 6,405,238 B1 | 6/2002 | Votipka | | 709/203 |
| 6,421,651 B1 | 7/2002 | Tedesco et al. | | 705/8 |
| 6,430,537 B1 | 8/2002 | Tedesco et al. | | 705/8 |
| 6,456,303 B1 | 9/2002 | Walden et al. | | 345/705 |
| 6,484,149 B1 | 11/2002 | Jammes et al. | | 705/26 |
| 6,498,835 B1 | 12/2002 | Skladman et al. | | 379/88.12 |
| 6,515,681 B1 * | 2/2003 | Knight | | 715/751 |
| 6,633,311 B1 | 10/2003 | Douvikas et al. | | 345/731 |
| 6,661,877 B1 | 12/2003 | Lee et al. | | 379/67.1 |
| 6,691,158 B1 | 2/2004 | Douvikas et al. | | 709/219 |
| 6,748,449 B1 | 6/2004 | Dutta | | 709/245 |
| 6,874,126 B1 | 3/2005 | Lapidous | | 715/711 |
| 6,879,691 B1 | 4/2005 | Koretz | | 380/255 |
| 6,889,213 B1 | 5/2005 | Douvikas et al. | | 705/67 |
| 6,952,730 B1 | 10/2005 | Najork et al. | | 709/225 |
| 7,017,109 B1 | 3/2006 | Douvikas et al. | | 715/501.1 |
| 7,024,451 B2 | 4/2006 | Jorgenson | | 709/203 |
| 7,069,308 B2 | 6/2006 | Abrams | | 709/218 |
| 7,117,254 B2 | 10/2006 | Lunt et al. | | 709/218 |
| 7,188,080 B1 | 3/2007 | Walker et al. | | 705/26 |
| 7,188,153 B2 | 3/2007 | Lunt et al. | | 709/218 |
| 7,194,552 B1 | 3/2007 | Schneider | | 709/245 |
| 7,231,428 B2 | 6/2007 | Teague | | 709/206 |
| 7,233,997 B1 | 6/2007 | Leveridge et al. | | 709/229 |
| 7,340,419 B2 | 3/2008 | Walker et al. | | 705/27 |
| 7,373,338 B2 | 5/2008 | Thompson et al. | | 707/3 |
| 7,451,161 B2 | 11/2008 | Zhu et al. | | 707/104.1 |
| 7,478,078 B2 | 1/2009 | Lunt et al. | | 707/1 |
| 7,487,441 B2 | 2/2009 | Szeto | | 715/234 |
| 7,499,940 B1 | 3/2009 | Gibbs | | 707/102 |
| 7,526,440 B2 | 4/2009 | Walker et al. | | 705/26 |
| 7,590,687 B2 | 9/2009 | Bales et al. | | 709/203 |
| 7,606,687 B2 | 10/2009 | Galbreath et al. | | 703/3 |
| 7,606,865 B2 * | 10/2009 | Kumar et al. | | 709/206 |
| 7,669,123 B2 | 2/2010 | Zuckerberg et al. | | 715/273 |
| 7,680,882 B2 | 3/2010 | Tiu et al. | | 709/203 |
| 7,685,036 B1 | 3/2010 | Hsu et al. | | 705/35 |
| 7,725,492 B2 | 5/2010 | Sittig et al. | | 707/784 |
| 7,752,251 B1 | 7/2010 | Shuster et al. | | 709/200 |
| 7,765,568 B1 | 7/2010 | Gagnon et al. | | 725/38 |
| 7,788,260 B2 | 8/2010 | Lunt et al. | | 707/727 |
| 7,797,256 B2 | 9/2010 | Zuckerberg et al. | | 705/319 |
| 7,809,805 B2 | 10/2010 | Stremel et al. | | 709/219 |
| 7,827,208 B2 | 11/2010 | Bosworth et al. | | 707/802 |
| 7,827,265 B2 | 11/2010 | Cheever et al. | | 709/223 |
| 7,835,950 B2 | 11/2010 | Walker et al. | | 705/27 |
| 7,890,501 B2 | 2/2011 | Lunt et al. | | 707/722 |
| 7,912,758 B2 | 3/2011 | Walker et al. | | 705/26 |
| 7,933,810 B2 | 4/2011 | Morgenstern | | 705/26.1 |
| 7,945,653 B2 | 5/2011 | Zuckerberg et al. | | 709/223 |
| 7,970,657 B2 | 6/2011 | Morgenstern | | 705/26.1 |
| 8,005,919 B2 | 8/2011 | Mehanna et al. | | 709/217 |
| 2001/0018698 A1 | 8/2001 | Uchino et al. | | 707/533 |
| 2002/0065671 A1 | 5/2002 | Goerz, Jr. et al. | | 705/1 |
| 2002/0130895 A1 | 9/2002 | Brandt et al. | | 345/708 |
| 2002/0152238 A1 | 10/2002 | Hayes | | 707/513 |
| 2003/0041147 A1 | 2/2003 | van den Oord et al. | | 709/227 |
| 2003/0061114 A1 * | 3/2003 | Schwartz et al. | | 705/26 |
| 2003/0115306 A1 | 6/2003 | Hagarty et al. | | 709/223 |
| 2003/0188263 A1 | 10/2003 | Bates et al. | | 715/513 |
| 2003/0196172 A1 | 10/2003 | Bates et al. | | 715/513 |
| 2004/0098269 A1 | 5/2004 | Wise et al. | | 705/1 |
| 2004/0143841 A1 | 7/2004 | Wang et al. | | 725/32 |
| 2004/0172405 A1 | 9/2004 | Farran | | 707/100 |
| 2004/0225708 A1 | 11/2004 | Christodoulou et al. | | 709/200 |
| 2004/0254881 A1 | 12/2004 | Kumar et al. | | 705/40 |
| 2005/0049939 A1 | 3/2005 | Lai et al. | | 705/27 |
| 2005/0076110 A1 | 4/2005 | Mathew et al. | | 709/223 |
| 2005/0144573 A1 | 6/2005 | Moody et al. | | 715/825 |
| 2005/0165793 A1 | 7/2005 | Mosterman | | 707/100 |
| 2005/0198128 A1 | 9/2005 | Anderson et al. | | 709/204 |
| 2005/0267940 A1 | 12/2005 | Galbreath et al. | | 709/206 |
| 2005/0278443 A1 | 12/2005 | Winner et al. | | 709/224 |
| 2006/0015821 A1 | 1/2006 | Parker et al. | | 715/800 |
| 2006/0021009 A1 | 1/2006 | Lunt | | 726/4 |
| 2006/0031404 A1 | 2/2006 | Kassab | | 709/218 |
| 2006/0064342 A1 | 3/2006 | Frengut et al. | | 705/10 |
| 2006/0155809 A1 | 7/2006 | Arav | | 709/204 |
| 2006/0168233 A1 | 7/2006 | Alcorn et al. | | 709/226 |
| 2006/0174340 A1 * | 8/2006 | Santos et al. | | 726/21 |
| 2006/0206454 A1 | 9/2006 | Forstall et al. | | 707/3 |
| 2006/0239546 A1 | 10/2006 | Tedesco et al. | | 382/159 |
| 2006/0248160 A1 | 11/2006 | Plummer | | 709/217 |
| 2007/0022021 A1 | 1/2007 | Walker et al. | | 705/26 |
| 2007/0028185 A1 | 2/2007 | Bhogai et al. | | 715/808 |
| 2007/0100779 A1 | 5/2007 | Levy et al. | | 705/500 |
| 2007/0112835 A1 | 5/2007 | McMullen et al. | | 707/102 |
| 2007/0113201 A1 | 5/2007 | Bales et al. | | 715/810 |
| 2007/0143704 A1 | 6/2007 | Laird-McConnell | | 715/781 |
| 2007/0192181 A1 * | 8/2007 | Asdourian | | 705/14 |
| 2007/0192299 A1 | 8/2007 | Zuckerberg et al. | | 707/3 |
| 2008/0040474 A1 | 2/2008 | Zuckerbert et al. | | 709/224 |
| 2008/0040475 A1 | 2/2008 | Bosworth et al. | | 709/224 |
| 2008/0046976 A1 | 2/2008 | Zuckerberg | | 726/4 |
| 2008/0059607 A1 | 3/2008 | Schneider | | 709/218 |
| 2008/0065604 A1 | 3/2008 | Tiu et al. | | 707/3 |
| 2008/0065701 A1 | 3/2008 | Lindstrom et al. | | 707/201 |
| 2008/0189292 A1 | 8/2008 | Stremel et al. | | 707/10 |
| 2008/0189380 A1 | 8/2008 | Bosworth et al. | | 709/207 |
| 2008/0189395 A1 | 8/2008 | Stremel et al. | | 709/219 |
| 2008/0189768 A1 | 8/2008 | Callahan et al. | | 726/4 |
| 2008/0281816 A1 | 11/2008 | Kim | | 707/6 |
| 2008/0313714 A1 | 12/2008 | Fetterman et al. | | 726/4 |
| 2009/0013413 A1 | 1/2009 | Vera et al. | | 726/30 |
| 2009/0024548 A1 | 1/2009 | Zhu et al. | | 706/21 |
| 2009/0031301 A1 | 1/2009 | D'Angelo et al. | | 717/178 |
| 2009/0037277 A1 | 2/2009 | Zuckerberg et al. | | 705/14 |
| 2009/0048922 A1 | 2/2009 | Morgenstern et al. | | 705/14 |
| 2009/0049014 A1 | 2/2009 | Steinberg | | 707/3 |
| 2009/0049036 A1 | 2/2009 | Juan et al. | | 707/5 |
| 2009/0049070 A1 | 2/2009 | Steinberg | | 707/101 |
| 2009/0049127 A1 | 2/2009 | Juan et al. | | 709/204 |
| 2009/0049525 A1 | 2/2009 | D'Angelo et al. | | 726/4 |
| 2009/0070219 A1 | 3/2009 | D'Angelo et al. | | 705/14 |
| 2009/0070334 A1 | 3/2009 | Callahan et al. | | 707/9 |
| 2009/0070412 A1 | 3/2009 | D'Angelo et al. | | 709/203 |
| 2009/0119167 A1 | 5/2009 | Kendall et al. | | 705/14 |
| 2009/0144392 A1 | 6/2009 | Wang et al. | | 709/217 |
| 2009/0158143 A1 | 6/2009 | Arav | | 715/261 |
| 2009/0158169 A1 | 6/2009 | Arav | | 715/751 |
| 2009/0182589 A1 | 7/2009 | Kendall et al. | | 705/5 |
| 2009/0193333 A1 | 7/2009 | Arav | | 715/261 |
| 2009/0193349 A1 | 7/2009 | Arav | | 715/764 |
| 2009/0198487 A1 | 8/2009 | Wong et al. | | 704/4 |
| 2009/0199135 A1 | 8/2009 | Arav | | 715/841 |
| 2009/0228342 A1 | 9/2009 | Walker et al. | | 705/10 |
| 2009/0228780 A1 | 9/2009 | McGeehan | | 715/234 |
| 2009/0287786 A1 | 11/2009 | Arav | | 709/206 |
| 2010/0049534 A1 | 2/2010 | Whitnah et al. | | 705/1 |
| 2010/0049852 A1 | 2/2010 | Whitnah et al. | | 709/226 |
| 2010/0132049 A1 | 5/2010 | Vernal et al. | | 726/27 |
| 2010/0162375 A1 | 6/2010 | Tiu, Jr. et al. | | 726/7 |
| 2010/0164957 A1 | 7/2010 | Lindsay et al. | | 345/440 |
| 2010/0169327 A1 | 7/2010 | Lindsay et al. | | 707/750 |
| 2010/0180032 A1 | 7/2010 | Lunt | | 709/225 |
| 2010/0185580 A1 | 7/2010 | Zhu et al. | | 706/52 |
| 2010/0198581 A1 | 8/2010 | Ellis | | 704/4 |
| 2010/0211996 A1 | 8/2010 | McGeehan et al. | | 726/4 |
| 2010/0211997 A1 | 8/2010 | McGeehan et al. | | 726/4 |
| 2010/0217645 A1 | 8/2010 | Jin et al. | | 705/9 |
| 2010/0229223 A1 | 9/2010 | Shepard et al. | | 726/5 |
| 2010/0257023 A1 | 10/2010 | Kendall et al. | | 705/10 |
| 2010/0257459 A1 | 10/2010 | Galbreath et al. | | 715/753 |
| 2010/0287368 A1 * | 11/2010 | Shuster et al. | | 713/150 |
| 2010/0306043 A1 | 12/2010 | Lindsay et al. | | 705/14.41 |
| 2010/0318571 A1 | 12/2010 | Pearlman et al. | | 707/784 |
| 2011/0004692 A1 | 1/2011 | Occhino et al. | | 709/228 |
| 2011/0004831 A1 | 1/2011 | Steinberg et al. | | 715/753 |
| 2011/0016169 A1 | 1/2011 | Cahill et al. | | 709/203 |
| 2011/0016381 A1 | 1/2011 | Cahill et al. | | 715/234 |
| 2011/0016382 A1 | 1/2011 | Cahill et al. | | 715/234 |
| 2011/0018342 A1 | 1/2011 | Park et al. | | 307/23 |

| | | | | |
|---|---|---|---|---|
| 2011/0022657 A1 | 1/2011 | Zhu et al. | | 709/204 |
| 2011/0023101 A1 | 1/2011 | Vernal et al. | | 726/7 |
| 2011/0023129 A1 | 1/2011 | Vernal et al. | | 726/28 |
| 2011/0044354 A1 | 2/2011 | Wei | | 370/468 |
| 2011/0055314 A1 | 3/2011 | Rosenstein et al. | | 709/203 |
| 2011/0055332 A1 | 3/2011 | Stein | | 709/206 |
| 2011/0055683 A1 | 3/2011 | Jiang | | 715/234 |
| 2011/0083101 A1 | 4/2011 | Sharon et al. | | 715/800 |
| 2011/0087526 A1 | 4/2011 | Morgenstern et al. | | 705/14.1 |
| 2011/0106630 A1 | 5/2011 | Hegeman et al. | | 705/14.71 |
| 2011/0125599 A1 | 5/2011 | Morin et al. | | 705/26.1 |
| 2011/0128699 A1 | 6/2011 | Heydari et al. | | 361/679.48 |
| 2011/0137902 A1 | 6/2011 | Wable et al. | | 707/737 |
| 2011/0137932 A1 | 6/2011 | Wable | | 707/769 |
| 2011/0145287 A1 | 6/2011 | Jiang et al. | | 707/780 |
| 2011/0145321 A1 | 6/2011 | Jiang | | 709/203 |
| 2011/0153377 A1 | 6/2011 | Novikov et al. | | 705/71.1 |
| 2011/0153412 A1 | 6/2011 | Novikov et al. | | 705/14.42 |
| 2011/0153416 A1 | 6/2011 | Walker et al. | | 705/14.49 |
| 2011/0153421 A1 | 6/2011 | Novikov et al. | | 705/14.52 |
| 2011/0154223 A1 | 6/2011 | Whitnah et al. | | 715/753 |
| 2011/0154842 A1 | 6/2011 | Heydari et al. | | 62/259.2 |
| 2011/0156480 A1 | 6/2011 | Park | | 307/23 |
| 2011/0161602 A1 | 6/2011 | Adams et al. | | 711/148 |
| 2011/0161980 A1 | 6/2011 | English et al. | | 718/105 |
| 2011/0161987 A1 | 6/2011 | Huang et al. | | 719/318 |
| 2011/0179347 A1 | 7/2011 | Proctor et al. | | 715/234 |
| 2011/0196855 A1 | 8/2011 | Wable et al. | | 707/711 |
| 2012/0066340 A1* | 3/2012 | Armstrong et al. | | 709/217 |

FOREIGN PATENT DOCUMENTS

| | | |
|---|---|---|
| WO | WO 02/061610 A1 | 8/2002 |
| WO | WO 2004/029780 A2 | 4/2004 |
| WO | WO 2007/109264 A3 | 9/2007 |

OTHER PUBLICATIONS 2.barchart.com/lookup.asp (Mar. 15, 2010).
abcnews.go.com/business (Mar. 15, 2010).
activetradermag.com/ (Mar. 15, 2010).
ADVFN.com as viewed on Mar. 21, 2007.
advfn.com/ (Mar. 15, 2010).
AllStocks.com as viewed on Mar. 21, 2007.
ant.com/tags/finance/?page=1 (Mar. 15, 2010).
asx.com.au/ (Mar. 15, 2010).
bigcharts.marketwatch.com/ (Mar. 15, 2010).
bloomberg.com/apps/tkrlookup (Mar. 15, 2010).
BoardCentral Website (Feb. 15, 2006).
boardcentral.com/ (Mar. 15, 2010).
boston.com/ (Mar. 15, 2010).
briefing.com/ (Mar. 15, 2010).
Bullpoo.com as viewed on Mar. 21, 2007.
businessweek.com/ (Mar. 15, 2010).
cboe.com/DelayedQuote/Symbol.aspx (Mar. 15, 2010).
ClearStation Website (Feb. 15, 2006).
clearstation.etrade.com/cgi-bin/symbol_search (Mar. 15, 2010).
CollectiveIntellect.com as viewed on Mar. 21, 2007.
earningswhispers.com/tickerlookup.asp (Mar. 15, 2010).
economist.com/index.html (Mar. 15, 2010).
edgar-online com/ (Mar. 15, 2010).
EliteTrader.com as viewed on Mar. 21, 2007.
EquityGroups.com as viewed on Mar. 21, 2007.
esignal.com/support/default.aspx (Mar. 15, 2010).
euronext.com/landing/indexMarket-18812-EN.html (Mar. 15, 2010).
FeedTheBull.com as viewed on Mar. 21, 2007.
Finance.Google.com as viewed on Mar. 21, 2007.
finance.yahoo.com (Mar. 15, 2010).
fool.com/ (Mar. 15, 2010).
Forbes.com (Mar. 15, 2010).
Forex Trading Website (Feb. 17, 2006).
foxbusiness.com/index.html (Mar. 15, 2010).
freeedgar.com/ (Mar. 15, 2010).
FreeRealTime Message Boards Website (Feb. 15, 2006).
ft.com/home/uk (Mar. 15, 2010).
globeinvestor.com/static/hubs/lookup.html (Mar. 15, 2010).
Google.com (Mar. 15, 2010).
hoovers.com (Mar. 15, 2010).
inc.com/ (Mar. 15, 2010).
individual.troweprice.com/public/Retail/Products-&-Services/Brokerage (Mar. 15, 2010).
investing.quicken.com/public/symbolLookup.asp (Mar. 15, 2010).
investools.com/ (Mar. 15, 2010).
investors.com/symbol.asp (Mar. 15, 2010).
investorshub.advfn.com/ (Mar. 15, 2010).
InvestorsHub.com as viewed on Mar. 21, 2007.
InvestorVillage Website (Feb. 17, 2006).
investorvillage.com/home.asp (Mar. 15, 2010).
kiplinger.com/ (Mar. 15, 2010).
londonstockexchange.com/home/homepage.htm (Mar. 15, 2010).
MarketWatch Message Boards Website (Feb. 15, 2006).
Marketwatch.com (Mar. 15, 2010).
mldirect.ml.com/ (Mar. 15, 2010).
money.cnn.com/magazines/fortune/ (Mar. 15, 2010).
money.cnn.com/quote/lookup/index.html (Mar. 15, 2010).
Moneycentral.msn.com/investor/common/find.asp?NextPage=/detail/stock_quote (Mar. 15, 2010).
Monitor110.com as viewed on Mar. 21, 2007.
MSN Money Message Boards Website (Feb. 15, 2006).
nasdaq.com/ (Mar. 15, 2010).
news.bbc.co.uk/ (Mar. 15, 2010).
nyse.com/ (Mar. 15, 2010).
nyse.com/attachment/amex_landing.htm (Mar. 15, 2010).
nytimes.com/ (Mar. 15, 2010).
online.barrons.com/home-page. (Mar. 15, 2010).
online.wsj.com/home-page (Mar. 15, 2010).
pennystock.com/ (Mar. 15, 2010).
personal.fidelity.com/research/stocks/content/stocksindex.shtml?bar=c (Mar. 15, 2010).
quote.com/help/resources/toolbox.jsp (Mar. 15, 2010).
quote.com/search.action (Mar. 15, 2010).
quote.com/std/search.action (Mar. 15, 2010).
quote.morningstar.com/tickerlookup.html (Mar. 15, 2010).
RagingBull Website (Feb. 15, 2006).
ragingbull.quote.com/cgi-bin/static.cgi/a=index.txt&d=mainpages (Mar. 15, 2010).
renaissancecapital.com/RenCap/Default.aspx (Mar. 15, 2010).
schwab.com/public/schwab/home/welcomep.html (Mar. 15, 2010).
scottrade.com/ (Mar. 15, 2010).
sec.gov/edgar.shtml (Mar. 15, 2010).
seekingalpha.com/ (Mar. 15, 2010).
sharebuilder.com/ (Mar. 15, 2010).
Silicon Investor Message Boards Website (Feb. 15, 2006).
siliconinvestor.advfn.com/ (Mar. 15, 2010).
SmallCapCenter.com Message Boards Website (Feb. 15, 2006).
SocialPicks.com as viewed on Mar. 21, 2007.
stockcharts.com/index.html (Mar. 15, 2010).
StockHouse Bullboards Website (Feb. 15, 2006).
stockhouse.com/ (Mar. 15, 2010).
StockPickr.com as viewed on Mar. 21, 2007.
StockSelector.com Message Boards Website (Feb. 15, 2006).
StockTickr.com as viewed on Mar. 21, 2007.
tdameritrade.com/welcome4.html (Mar. 15, 2010).
The Motley Fool Discussion Boards Website (Feb. 15, 2006).
thedeal.com/ (Mar. 15, 2010).
TheLion.com as viewed on Mar. 21, 2007.
thelion.com/ (Mar. 15, 2010).
thestreet.com/quote/%5EDJI.html?pg-qcn& (Mar. 15, 2010).
tickertech.com/cgi/?a=lookup (Mar. 15, 2010).
tmx.com/ (Mar. 15, 2010).
traders.com/ (Mar. 15, 2010).
us.etrade.com/e/t/home (Mar. 15, 2010).
usatoday.com/money/2007-05-15-search-tips_N.htm (Mar. 15, 2010).
vanguard.com/ (Mar. 15, 2010).
wallstreetselect.com/ (Mar. 15, 2010).
WallStreetTape.com Website (Feb. 15, 2006).
Wallstrip.com as viewed on Mar. 21, 2007.
washingtonpost.com/ (Mar. 15, 2010).

whispernumber.com/index.jsp (Mar. 15, 2010).
Yahoo! Message Boards Website (Feb. 15, 2006).
zacks.com/ (Mar. 15, 2010).
Nicholas C. Zakas, *Professional JavaScript for Web Development*, Wrox (2005), pp. 362-364.
Michael Glass, *Beginning PHP, Apache, MySQL Web Development*, Wiley Publishing (2004), p. 361.
James Keogh, *JavaScript Demystified*, McGraw-Hill Osborne Media (2005), pp. 294-305.
Notice of Allowance from U.S. Appl. No. 11/384,957 which was mailed on Feb. 25, 2009.
Notice of Allowance from U.S. Appl. No. 12/334,024 which was mailed on Mar. 22, 2011.
Notice of Allowance from U.S. Appl. No. 12/334,037 which was mailed on Oct. 1, 2010.
Notice of Allowance from U.S. Appl. No. 12/334,063 which was mailed on Sep. 20, 2010.
Office Action from U.S. Appl. No. 11/384,957 which was mailed on May 13, 2008.
Office Action from U.S. Appl. No. 12/334,024 which was mailed on Aug. 5, 2010.
Office Action from U.S. Appl. No. 12/334,037 which was mailed on Mar. 9, 2010.
Office Action from U.S. Appl. No. 12/334,063 which was mailed on Mar. 9, 2010.
Office Action from U.S. Appl. No. 12/334,068 which was mailed on Jun. 10, 2011.
Office Action from U.S. Appl. No. 12/334,068 which was mailed on Aug. 4, 2010.
Office Action from U.S. Appl. No. 12/334,093 which was mailed on May 12, 2011.
Office Action from U.S. Appl. No. 12/334,093 which was mailed on Aug. 18, 2010.
google.com screenshot captured by web.archive.org (Dec. 15, 2004).
Bitflux Blog Wild screenshot captured by web.archive.org (Feb. 6, 2005).
Jon Udell, *The Browser Reloaded*, InfoWorld.com (Feb. 21, 2005).
J. Keith, *DOM Scripting*, Keith (2005), p. 303.
F. Schneider, *How to Do Everything with Google*, McGraw-Hill (2004), p. 51-52.
c/net home page captured by web.archive.org (Mar. 1, 2005), Figs 1-4.
Office Action from U.S. Appl. No. 12/435,296 which was mailed on Feb. 3, 2011.
Office Action from U.S. Appl. No. 12/435,296 which was mailed on Aug. 20, 2010.
Office Action from U.S. Appl. No. 13/099,342 which was mailed on Sep. 6, 2011.
Sharma, Niraj, "Adding 'Google Suggest' functionality to an ASP.NET application," Dec. 1, 2005.
Narra, Gavi, "Google Suggest like Dictionary," Dec. 27, 2004.
Notice of Allowance for U.S. Appl. No. 12/334,024 dated Dec. 29, 2011.
Notice of Allowance for U.S. Appl. No. 12/334,024 dated Jan. 27, 2012.
Notice of Allowance for U.S. Appl. No. 12/435,296 dated Mar. 22, 2011.
Notice of Allowance for U.S. Appl. No. 12/435,296 dated Dec. 29, 2011.
Notice of Allowance for U.S. Appl. No. 12/435,296 dated Jan. 27, 2012.
Notice of Allowance for U.S. Appl. No. 12/435,296 dated Feb. 27, 2012.
Ex. Interview Summary for U.S. Appl. No. 13/099,342 dated Mar. 2, 2012.

* cited by examiner

INSTANTANEOUS SYMBOL LOOKUP

RELATED APPLICATIONS

The present application is a continuation of U.S. application Ser. No. 12/435,296 filed May 4, 2009, which is incorporated herein by reference, and which is a continuation of U.S. application Ser. No. 11/384,957 filed Mar. 20, 2006, now issued under U.S. Pat. No. 7,529,795, which is incorporated herein by reference and which, in turn, incorporates by reference U.S. provisional application Ser. No. 60/784,140 filed Mar. 20, 2006 and U.S. provisional application Ser. No. 60/784,141 filed Mar. 20, 2006, both of which are incorporated herein by reference.

BACKGROUND

1. Field of the Invention

The present invention relates to computer-implemented techniques for assisting in the completion of text inputted by a user and, more particularly, to identifying candidate text to input into a text field based on text typed by a user into the text field.

2. Related Art

Computer software has long been used to reduce the effort that computer users need to expend to provide textual input. For example, conventional word processing software typically supports macros, which may be pre-defined by the software vendor and/or defined by the user, for replacing a short text string typed by the user with a longer text string, thereby eliminating the need for the user to manually type the longer text string. For example, consider a macro which defines the text "Sincerely yours" as a replacement for the text "sy". When the user types "sy", the word processor may automatically replace "sy" with "Sincerely yours".

The word processor may maintain multiple macros, each of which defines a mapping between source text (the text typed by the user) and replacement text. As the user types, the word processor determines whether the text most recently typed by the user matches the source text of any existing macro. If such a match is found, the word processor replaces the typed source text with the corresponding replacement text defined by the macro. This feature is implemented, for example, in the widely used Microsoft Word word processor as part of the "AutoCorrect" feature.

Another technique that some computer software uses to reduce the number of keystrokes required to be typed by the user is the following. As the user types, the software attempts to match the most-recently typed text against text previously typed by the user in the same context. For example, in some web browsers, as the user types the web address (URL) of a web site in the address bar, the web browser attempts to match the address being typed by the user with addresses previously typed by the user. As the user types, the web browser displays a list of matches.

For example, assume that the user has previously typed "www.google.com", "www.books.com", "www.booksamillion.com", and "www.booksense.com" into the address bar. If the user next begins typing "www" into the address bar, the web browser may display all four previously-typed addresses below the address bar, because "www" matches the beginning of all such addresses.

If the user continues to type "www.books", the web browser will eliminate "www.google.com" from the list of possible matches because it no longer matches the text being typed by the user. The list will still, however, display "www.books.com", "www.booksamillion.com", and "www.booksense.com" in the list, because all three of these previously-typed addresses match the text being typed by the user. As the user continues to type, any address having leading text that does not match the typed text will be eliminated from the list of potential matches.

At any point, the user may select one of the addresses in the list of possible matches (such as by using a mouse to click on the address or by using the arrow and ENTER keys on the keyboard), thereby causing the selected address to be entered into the address bar, and thereby eliminating the need for the user to manually type the entire address. This can save the user significant time and effort, particularly when the address selected is very long. This feature has been used more generally in various other kinds of software requiring the user to type text into the same form fields on multiple occasions.

Users stand to benefit from additional features which reduce the number of keystrokes required to be made by the user.

SUMMARY

A computer program assists in the completion of text input provided by a user. For example, the computer program may maintain a list of n-tuples (where n>1), each of which includes n text strings. For example, each n-tuple may include a stock ticker symbol and the name of a company having that stock ticker symbol. As the user types each character, the program determines whether the text typed by the user so far matches any of the text strings in the n-tuples. The program provides the user with an indication of whether any matches have been found, such as by displaying a list of the n-tuples having text matching the text typed by the user so far. The program then allows the user to select one of the matching n-tuples. The program uses text (such as a stock ticker symbol) from the user's selection to complete the text input.

DETAILED DESCRIPTION

Figure 1:
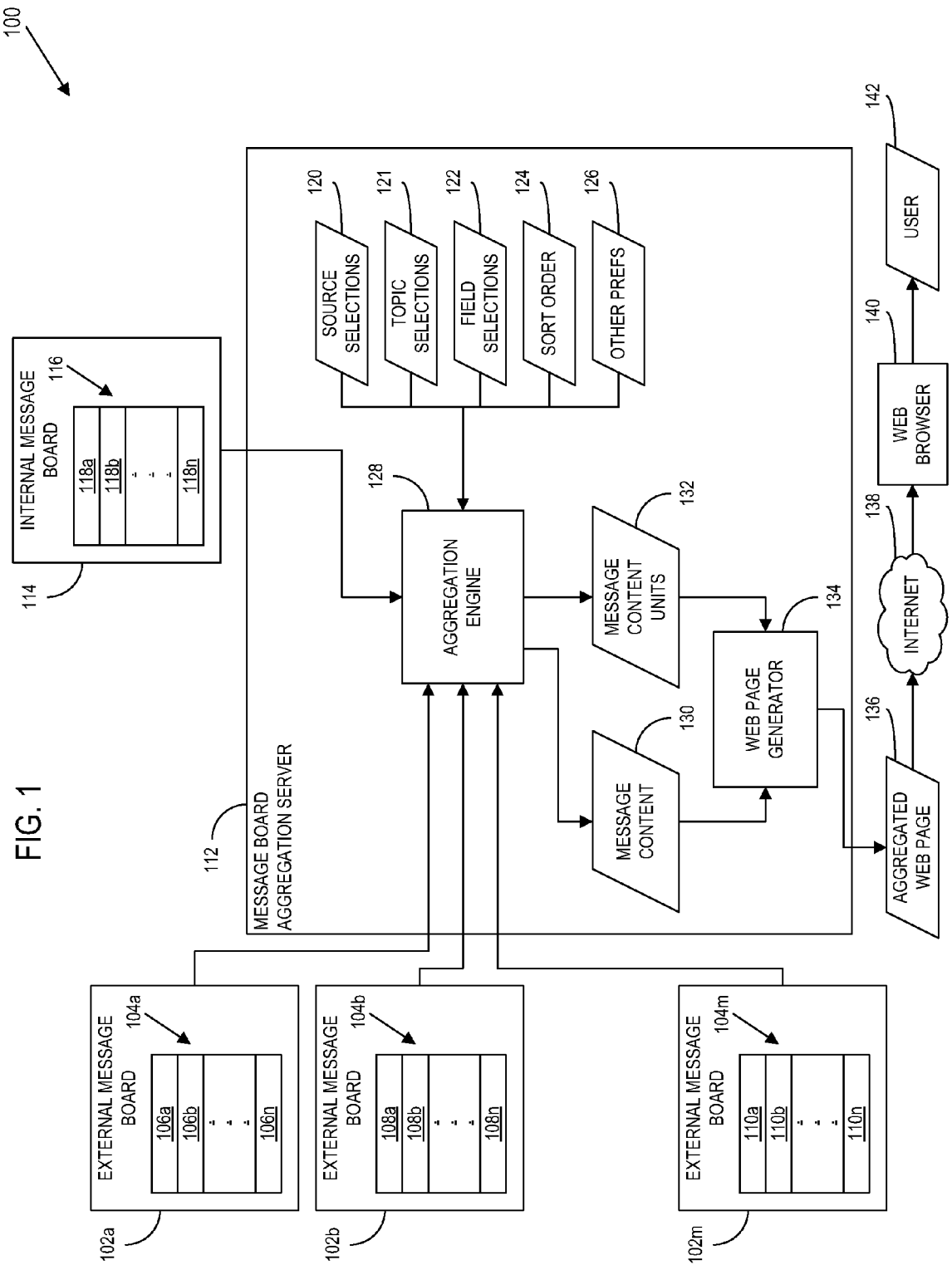
FIG. 1 is a dataflow diagram of a message board aggregation system according to one embodiment of the present invention.
Figure 2:
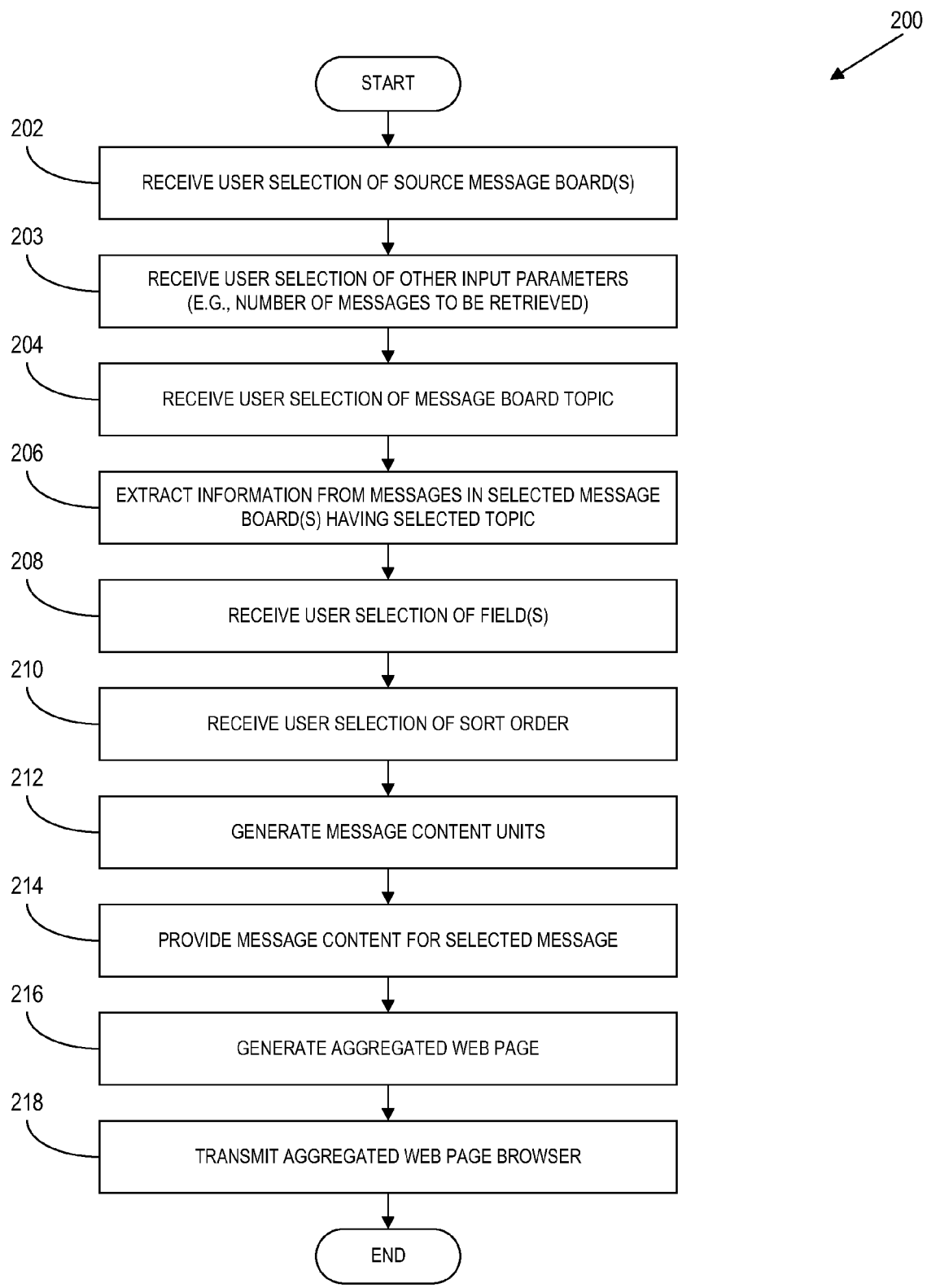
FIG. 2 is a flowchart of a method performed by the system of FIG. 1 according to one embodiment of the present invention.
Figure 3:
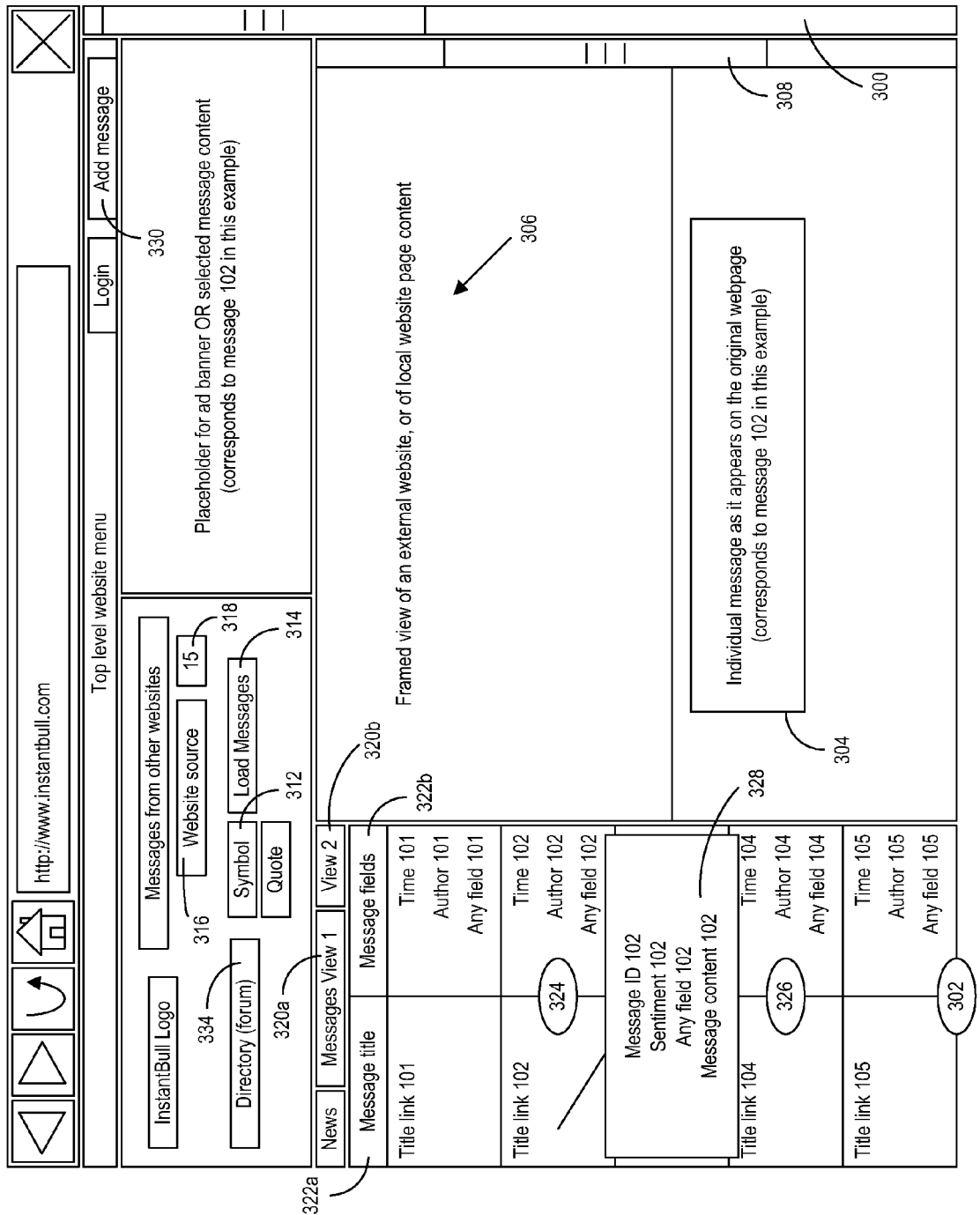
FIG. 3 is a window displayed by the message board aggregation system of FIG. 1 according to one embodiment of the present invention.

Referring to FIG. 1, a dataflow diagram is shown of a message board aggregation system 100 according to one embodiment of the present invention. Referring to FIG. 2, a flowchart is shown of a method 200 performed by the system 100 of FIG. 1 according to one embodiment of the present invention. Referring to FIG. 3, a window 300 displayed by the message board aggregation system 100 of FIG. 1 is illustrated according to one embodiment of the present invention.

In general, the window 300 shown in FIG. 3 contemporaneously displays a table 302 containing message table content (e.g., message title, message author, message ID, message sentiment, message time of writing, message web page source, person being replied to) and message content 304 corresponding to a message represented by one of the entries in the message table 302. In the embodiment illustrated in FIG. 3, the message content 304 is displayed in a web page 306 from a message board web site to which the message content 304 was originally posted. In the embodiment illustrated in FIG. 3, the source web page 306 (containing the message content 304) is displayed in a first frame 308 of the web page 300, and the message table 302 is displayed in a second frame of the web page 300.

The web page 306 is an example of a "source" web page as that term is used herein. The message table 302 may include summaries of messages originally posted to more than one source web page. The web page 300, therefore, provides an aggregation service which aggregates messages from a plurality of web-based message boards. The web page 300, therefore, is referred to herein as an "aggregation" web page.

Having described certain general features of particular embodiments of the present invention, techniques that may be used to implement embodiments of the present invention will now be disclosed. Referring to FIG. 1, multiple external message boards 102a-m are illustrated. For ease of illustration and explanation, each of the message boards 102a-m is illustrated simply as a set of messages. More specifically, message board 102a includes a set of messages 104a, including messages 106a-n; message board 102b includes a set of messages 104b, including messages 108a-n; and message board 102m includes a set of messages 104m, including messages 110a-n. In practice, the message boards 102a-m may be implemented using web servers or any other appropriate kind of technology.

Furthermore, although only three external message boards 102a, 102b, and 102m are shown in FIG. 1 for purposes of example, the system 100 may include and/or access any number of external message boards, as indicated by the variable m. Furthermore, the term "message board" is not limited to any particular kind of communications mechanism, and includes not only web-based message boards, but also newsgroups and email. Although each of the message boards 102a-m is shown in FIG. 1 as including the same number of messages n, the number of messages may vary among the message boards 102a-m.

A single message board, such as a web-based financial message board, may include a plurality of topics, each of which may include a plurality of threads or sub-topics. For ease of illustration and explanation, each of the message boards 102a-m is illustrated in FIG. 1 as containing only a single thread of messages. This does not represent a limitation of the present invention. Rather, the techniques disclosed herein may be applied to message boards including any number of topics, threads, or other groupings of messages.

The aggregation system 100 also includes a message board aggregation server 112 and a corresponding message board 114 (which includes set 116 of messages 118a-n). The message board 114 is managed by the aggregation server 112 or by the same entity that manages the aggregation server. Therefore, the message board 114 will be referred to herein as an "internal" message board, while the message boards 102a-m will be referred to herein as "external" message boards in relation to the aggregation server 112. As will be described in more detail below, the aggregation server 112 aggregates messages from two or more of the message boards 102a-m and 114, and displays content from the aggregated messages in the web page 300.

Referring again to FIG. 2, the system 100 of FIG. 1 may perform the method 200 to aggregate content from the message boards 102a-m and 114 to display aggregated message content in the window 300. A user 142 uses a web browser 140 to browse over the Internet 138 to a web site served by the aggregation server 112. The web page 300 is an example of a web page that may be part of such a web site. Upon visiting the web site, the user 142 selects one or more source message boards from which to view message content and summaries (step 202). The user 142 may, for example, make this selection by selecting the name of an external message board (such as one of the external message boards 102a-m) from a selection of sources accessible in any of a variety of formats, one example of which is a drop-down list 316. Note, however, that the user 142 may select more than one source message board.

In the particular example illustrated in FIG. 3, the web page 300 combines content extracted from the single external message board indicated by the selection in the drop-down list 316 with content extracted from the internal message board 114 associated with the aggregation server 112. Furthermore, in the example illustrated in FIG. 3, the user 142 may use drop-down list 318 to select the number of message summaries to be displayed in message table 302.

The user 142 selects other input parameters (such as the number of messages to be retrieved) (step 203). As described in more detail below, the aggregation server 112 may store the other input parameters in a set of other preferences 126.

The user 142 selects a particular message board topic to view (step 204). The user 142 may, for example, make this selection by identifying a particular company, such as by typing the company's name or stock ticker symbol in text field 312 and clicking button 314. This is only one of many ways in which the user may select a message board topic to view.

Furthermore, in the embodiment illustrated in FIG. 3, the web page 300 also includes a directory (forum) 334 user interface control which may, for example, take the form of a drop-down list. For example, the directory control 334 may allow the user to select either a "stock" forum or a "sports" forum. If the user 142 selects the "stock" forum, then the web page 300 may enable selection of stock symbols in text field 312, while if the user 142 selects the "sports" forum, then the web page 300 may enable selection of sports symbols in text field 312. More generally, the user's selection in the directory control 334 dictates which group of symbols is available for selection in the text input field 312. The use of the directory control 334 is provided merely for purposes of example and does not constitute a limitation of the present invention.

The user's message board selection is transmitted by the web browser 140 over the Internet 138 to the message board aggregation server 112. In response to receiving the user's selection, the aggregation server 112 retrieves information derived from messages in the selected source message board (s) having the selected topic (step 206). In the embodiment illustrated in FIG. 3, the aggregation server 112 also retrieves message content from the internal message board 114. This is not, however, a requirement of the present invention. The internal message board 114 may, for example, be selectable or de-selectable as a source by the user 142 in the same manner as the external message boards 102a-m.

Note further that any subset of the external message boards 102a-m may be selectable as a source by the user 142. Such a subset may, for example, consist of all of the external message boards 102a-m, any one of the message boards 102a-m, or any combination of fewer than all of the message boards 102a-m.

The information extracted from the selected source message board(s) by the aggregation server may include any of a variety of information that may be of interest to the user 142.

Examples of information that may be extracted from each on-topic message in the selected message board(s) includes, but is not limited to the message title, author, ID, sentiment, time of writing, web page source, person being replied to, and message statistics (e.g., the number of times others have recommended the message, or a rating of the popularity of the message).

At any time during performance of the method 200 illustrated in FIG. 2, the user 142 may select one or more fields to be displayed in the message table 302 (step 208). For example, in the embodiment illustrated in FIG. 3, the message table includes a column 322a labeled "Message Titles," which always displays the titles of the messages summarized in the table 302. The table 302 also includes, however, a second column 322b having content that may be varied by the user 142. More specifically, the user 142 may select link 320a to cause the column 322b to display the authors of the messages being summarized in the table 302 (as illustrated in FIG. 3). Similarly, the user 142 may select link 320b to cause the column 322b to display the times at which the messages being summarized in the table 302 were posted.

The particular selection of fields allowed in the embodiment illustrated in FIG. 3 is merely an example and does not constitute a limitation of the present invention. Rather, the user 142 may be allowed to select any combination of message fields for display in the table 302. Other examples of two fields from which the user 142 may select include, but are not limited to: message Title and Author fields; message Title and Time Submitted fields; and message Author and Author Attribute fields. Furthermore, a single column in the table 302 may display content from more than one field. For example, a single "time and author" column may simultaneously display both message time and author.

At any time during performance of the method 200 illustrated in FIG. 2, the user 142 may select an order in which message summaries are to be sorted in the message table 302 (step 210). For example, in the embodiment illustrated in FIG. 3, the user 142 may select the heading of column 322a to cause the contents of the table 302 to be sorted by message title, or select the heading of column 322b to cause the contents of the table 302 to be sorted by the contents of column 322b (e.g., message author or posting time). Alternatively, for example, the contents of the table 302 may be sorted automatically by posting time. Once again, these particular sorting options are merely examples and do not constitute limitations of the present invention.

The aggregation server 112 keeps track of: (1) the source message board(s) selected by the user 142 in source selections 120; (2) the topic (e.g., company) selected by the user 142 in topic selection 121; (3) the field(s) selected by the user 142 in field selections 122; (4) the sort order 124 selected by the user 142 in sort order 124; and (5) any other preferences 126 specified by the user 142.

The aggregation server 112 includes an aggregation engine 128, which generates message content units 132 based on the information extracted in step 206 and the user preferences described above (step 212). For example, the message content units 132 may include a content unit for each message that matches the topic selection 121 (e.g., company) in any of the source message board(s) indicated by the source selection(s) 120. Each of the message content units 132 may include information only for the fields specified by the field selections 122, but this is not required. The message content units 132 may, for example, include extracted information for fields other than those specified by the field selections. The message content units 132 may include all of the information that was extracted in step 206.

As will be described in more detail below, the information in the message content units 132 forms the basis for the information displayed in the message table 302 on the web page 300 (FIG. 3). In the embodiment illustrated in FIG. 3, the frame 308 displays a web page 306 corresponding to one of the message summaries displayed in the message table 302. When the web page 300 is first displayed, the message content corresponding to the first message summary in the table 302 may be displayed by default in the frame 308. Thereafter, the user 142 may select any of the message summaries in the table 302, such as by clicking on the title of the message in column 322a, to cause message content for a different message to be displayed-in the frame 308.

The aggregation engine 128, therefore, provides message content 130 corresponding to the currently-selected message summary in the message table 302 (step 214). The aggregation engine 128 may, for example, provide the content 130 in the form of HTML and/or other web content by copying the content 130 from its source message board (e.g., one of the external message boards 102a-m or the internal message board 114). The content 130 may either be copied to a storage medium local to the aggregation server 112, or merely passed as a reference to the client web browser 140, which may retrieve the message content 130 directly from its source and display it in the frame 308, without using the aggregation server 112 to serve the content 130 to the user 142.

The aggregation server 112 includes a web page generator 134, which produces an aggregated web page 136 (including HTML and/or other web content) that includes both the message content units 132 and the message content 130 (or a link to the message content 130) (step 216). The aggregated web page 136 may, for example, include a first frame for displaying a table including information from the message content units 132, and a second frame for displaying the message content 130.

The aggregation server 112 transmits the aggregated web page 136 to the web browser 140 over the Internet (step 218). The web browser 140 displays a window (such as the window 300 shown in FIG. 3) including: (1) web content (such as the web page 306) representing a first message posted to a first online forum, such as the external message board 102a; and (2) a plurality of message summaries (such as are displayed in the table 302) including information derived from the first message (such as the message summary 324 of the message 304) and second information derived from a second message in the plurality of messages (such as the message summary 326 of another message not displayed in the window 300). The web content and the message summaries may be displayed in different frames in the same window.

As described above, the message content units 132 that are downloaded by the web browser 140 to the local machine of the user 142 may include more information than is displayed in the table 302. The table 302 may, for example, be designed to display only the information that is considered most important to the user 142, such as the title, author, and/or timestamp of the aggregated messages. The user 142 may, however, read a particular one of the message summaries in the table 302 and desire to obtain additional information about the corresponding message. Although the user 142 could obtain such additional information by clicking on the message summary, thereby causing the corresponding message web content to be displayed in the frame 308, this requires the web browser 140 to download and render additional web content. Acquiring additional information about many messages in this way may therefore be tedious and time-consuming.

Alternatively, the web page 300 allows the user 142 to quickly obtain additional summary information about any message listed in the table 302 by, for example, moving and holding ("hovering") the mouse cursor over the message's summary. For example, in the case illustrated in FIG. 3, the user 142 has hovered the mouse cursor over message summary 324, thereby causing the web page 300 to display a tooltip 328 containing additional summary information about the source message 304. In the example illustrated in FIG. 3, the tooltip 328 includes additional information such as the message ID, author, sentiment, date and time, and the beginning of the message text.

Because the additional summary information has been preloaded by the web browser 140 in the process of downloading the message content units 132 from the aggregation server 112, the web browser 140 may generate and display the tooltip essentially instantaneously, and without again accessing the server 112. This allows the user 142 to quickly browse such additional information for many messages listed in the table 302 quickly and easily, simply by moving the mouse cursor over the corresponding message summaries.

The aggregation of messages from multiple message boards at multiple URLs into a single rich web page, including content initially is hidden and that may be displayed essentially instantaneously by the web browser client 140 without the need to make an additional access to the server 112, is made convenient by the increasing availability of broadband connectivity to users. Such broadband connectivity increasingly is available not only through wired networks at home and in the workplace but also through wireless networks accessible using mobile computing devices. By making it feasible for the client web browser 140 to download content-rich web pages without causing the user 142 to incur a significant delay before the web page is displayed, broadband connections allow the web browser 140 to provide a degree of interactivity in web pages that approaches or even matches that previously available only in client-side applications.

Note that the use of a tooltip is provided merely as an example and does not constitute a limitation of the present invention. Rather, the additional summary information may be provided in other forms, such as in a static object (e.g., a text box) on the web page 300. Furthermore, the user 142 may cause the additional summary information to be displayed using actions other than hovering, such as clicking or pressing a hotkey.

The tooltip, or other graphical user interface element that is used to display additional summary information, may be variable in size. For example, the web page 300 may allow the user 142 to select from among three sizes: small, large, and very large. The very large size may be particularly useful for users who are visually impaired. Such a feature may make it possible for visually impaired users to benefit from the features of the web page 300, without requiring the design of the web page (e.g., the font size of text in the table) to change.

Furthermore, the web page 300 may be implemented such that selecting (e.g., hovering or clicking) one of the message summaries in the table 302 always causes the corresponding message to be displayed in the frame 308, while the additional summary information (e.g., tooltip) is displayed. Although there may be some delay in loading and displaying the full message in the frame 308, the user 142 may view the additional summary information essentially immediately, thereby enabling the user 142 to decide quickly whether to wait for the remainder of the message to load or to move on to the next message summary.

The web page 300 may allow the user 142 to post additional messages to any of the source message boards. For example, in the embodiment illustrated in FIG. 3, the web page 300 includes an "Add Message" button 330 that the user 142 may click to add a new message. When the user 142 clicks the button 330, a web page may be displayed which allows the user 142 to type a new message and submit it either to the internal message board 114 or to one of the external message boards 102*a-m*. In either case, once the user 142 has posted a new message, the message may be displayed in the frame 308, and a summary of the message may be displayed in the table 302.

Similarly, the web page 300 may include a "Reply Message" button (not shown in FIG. 3) that the user 142 may click to reply to the message currently being shown in the frame 308. When the user 142 submits a reply, the reply may be posted to the same message board as the message to which the user 142 has replied, whether that message board is external or internal to the aggregation server 112. Alternatively, the user 142 may be allowed to choose whether to reply from the internal message board 114 maintained by the aggregation server 112 or from the external message board currently displayed in the frame 308.

Message summaries in the message table 302 may be sorted in any manner. For example, the summaries may be sorted by time of posting by default. The user 142 may, however, sort these messages in other ways (e.g., by message title, message author, message ID, message sentiment, message web page source, person being replied to). If the message table 302 includes message summaries derived from multiple source message boards, the message table 302 may nonetheless display the summaries in an aggregated sorted list. For example, the summaries may be sorted by time of posting, in which case message summaries corresponding to messages from different source message boards may be interwoven with each other according to the times at which they were posted. This feature provides the user 142 with a unified view of messages across multiple message boards.

Among the advantages of the invention are one or more of the following. The features of the web page 300 illustrated in FIG. 3 provide an improvement in speed and ease of use when accessing message table content and corresponding message content, in comparison to conventional systems for performing such functions. In particular, the web page 300 both allows the user 142 to view a message summary and corresponding message content contemporaneously, and to quickly scan additional message summary information not contained in the table 302.

Furthermore, the techniques disclosed herein make it possible to read and write messages from and to multiple message board sources. Writing messages can be performed either from the web page 300, or at the original message board source in the frame 308. This saves the user 142 time in comparison to reading and writing multiple message boards using distinct web browser windows for each message board.

By providing features that are attractive and useful to frequent users of financial message boards, the techniques disclosed herein provide an opportunity to generate significant revenue from advertising. An example of a banner advertisement for a financial services firm is shown on the web page 300 in FIG. 3. Note, however, that the web page 300 (and the web site of which it is a part) may generate revenue using any mechanism, not merely banner advertisements.

Furthermore, note that content other than an advertisement may occupy the space occupied by the advertisement in FIG. 3. For example, the aggregation server 112 may display an advertisement for basic (i.e., non-paid) users, but display additional summary information (such as the information displayed by the tooltip 328 in FIG. 3) in a static object (such as a text box) in the same location as but instead of the advertisement for premium (i.e., paid) users. The web page 300, in other words, may be designed to make efficient use of available screen "real estate" to tailor the content that is displayed in an attempt to maximize revenue.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. In particular, the functions performed by the aggregation server 112 shown in FIG. 1 may be further subdivided into additional components for performing the same functions.

Although certain examples disclosed herein relate to financial message boards, the present invention is not limited to such examples. More generally, the techniques disclosed herein may be applied to any kind of messaging system, such as email and newsgroups, and to messaging systems containing messages whose content does not relate to finance. Furthermore, the techniques disclosed herein may be applied to aggregate content from web sites and other communications systems that are not designed as message boards. For example, the techniques disclosed herein may be used to aggregate news articles posted to news web sites, such as the web site for the New York Times (www.nytimes.com) or the Business Week (www.businessweek.com), even though such web sites are not designed as message boards to which members of the public may post messages. The term message, as used herein, therefore, includes not only messages posted to message boards, but more generally to any unit of communication, such as an email message, a newsgroup posting, or a news article posted by an administrator to a news web site.

As described above, the aggregation server 112 extracts certain information from source message boards to produce the message content units 132. Examples of categories from which information may be derived include, but are not limited to: message title, message author, message identifier, message sentiment, message timestamp, message web address, message thread, message attribute (e.g., size), message link (links contained in the message), message keyword (keywords contained in the message), message recipient, and message statistics (e.g., the number of times others have recommended the message, or a rating of the popularity of the message). The user 142 may be allowed to sort the aggregated message summaries displayed in the message table 302 by, for example, any of the categories mentioned above.

Ease of visual cognition is key to a successful user interface. Various techniques may be combined with those described above to improve such ease of visual cognition. For example, message summaries in the table 302 may be color-coded or otherwise coded (such as by the use of distinct icons or words) according to their source or to any other attribute, such as according to any of the categories mentioned above. The table 302 may include any number of rows and columns. Columns may be assigned to message categories (attributes) in any way. For example, a single column may correspond to a single attribute or to multiple attributes. For example, in one embodiment, there are two columns: (1) title and (2) time and author.

The web browser 140 is not limited to any particular web browser application. The web browser 140 may, for example, be of any kind and operate on any kind of device (e.g., desktop computer, laptop computer, personal-digital assistant, or smart phone). Furthermore, although the network 138 in FIG. 1 is labeled as the "Internet," the web browser 140 and aggregation server 112 may communicate over any kind of network, such as a private intranet.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Figure 4A:
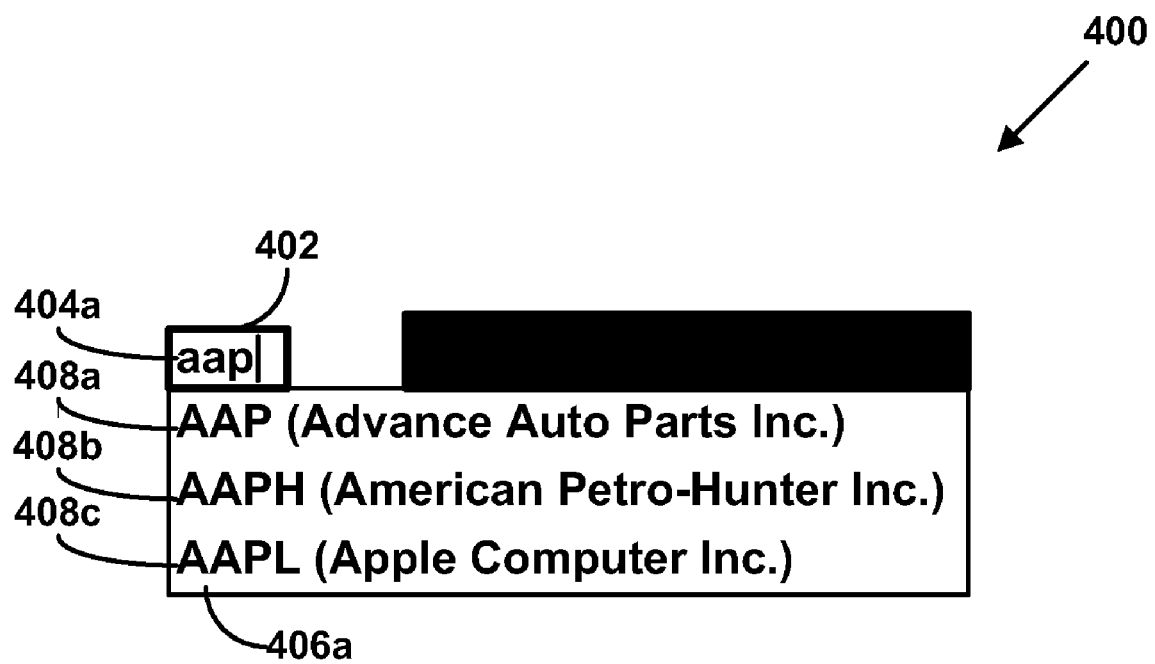
FIGS. 4A-4C are illustrations of a graphical user interface text input control for use in assisting in the completion of text input by a user according to embodiments of the present invention.

Referring to FIG. 4A, an illustration is shown of a graphical user interface text input control 400 for use in assisting in the completion of text input by a user according to one embodiment of the present invention. The control 400 includes a text input field 402 into which the user may type text.

In the particular embodiment illustrated in FIG. 4A, the text input field 402 is used for entering either the name of a company or the stock ticker symbol of the company. The text input field 402 may, for example, be implemented in a financial message board aggregation web site of the kind described in the above-referenced patent application entitled "Message Aggregator", now issued under U.S. Pat. No. 7,529,795. The text input field 402, however, may be used for entering text of any kind, and is not limited to use in any particular kind of computer program (such as a web browser).

For purposes of the following discussion, however, assume that the text input field 402 is used to enter either the name of a company or the stock ticker symbol of the company. The program that provides the text input field 402 may maintain a list of ticker-name tuples. For example, one tuple may include the stock ticker symbol "AAP" and the name of the company having that stock ticker symbol, namely "Advance Auto Parts Inc." Another tuple may, for example, include the stock ticker symbol "AAPH" and the name of the company having that stock ticker symbol, namely "American Petro-Hunter Inc." Yet another tuple may, for example, include the stock ticker symbol "AAPL" and the name of the company having that stock ticker symbol, namely "Apple Computer Inc."

In the particular example illustrated in FIG. 4A, the user has begun to type the text "aap". As the user types, the program that provides the text input field 402 may attempt to match the text that the user has typed so far against any of the text in the tuples maintained by the program. For example, the program may attempt to match the text typed by the user so far against both the stored list of stock ticker symbols and the list of corresponding company names.

If the program determines that the text typed by the user so far matches any of the text in a particular tuple, the program may indicate such a match to the user. For example, if the program determines that the text typed by the user so far matches either the stock ticker symbol or the company name of a particular tuple, the program may indicate to the user that a match has been found. If matches are found with text in multiple tuples, the program may indicate to the user that multiple matches have been found.

In the particular embodiment illustrated in FIG. 4A, any matches are indicated to the user by displaying a list of matching tuples, consisting of the stock ticker name followed by the company name (in parenthesis) of each matching tuple. For example, in FIG. 4A, the text typed so far by the user ("aap") matches three stock ticker symbols ("AAP", "AAPH", and "AAPL"). The program therefore displays the text 408*a-c* of the three matching tuples in the list 406*a*. It should be appreciated that the contents of the list may change as the user continues to type additional characters in the text input field 402 or as the user deletes previously-typed characters in the text input field 402.

Furthermore, the subset of each text item in the list that matches the input text may be visually emphasized. For example, in FIG. 4A, the text "AAP" may be highlighted (such as by color coding) in each of the matching text strings 408*a*, 408*b*, and 408*c*. Highlighting the matching text in this way enables the user to quickly recognize the basis of each match, thereby enabling the user to quickly determine whether any of the displayed text strings 408*a-c* corresponds to the company for which the user was searching.

Figure 4B:
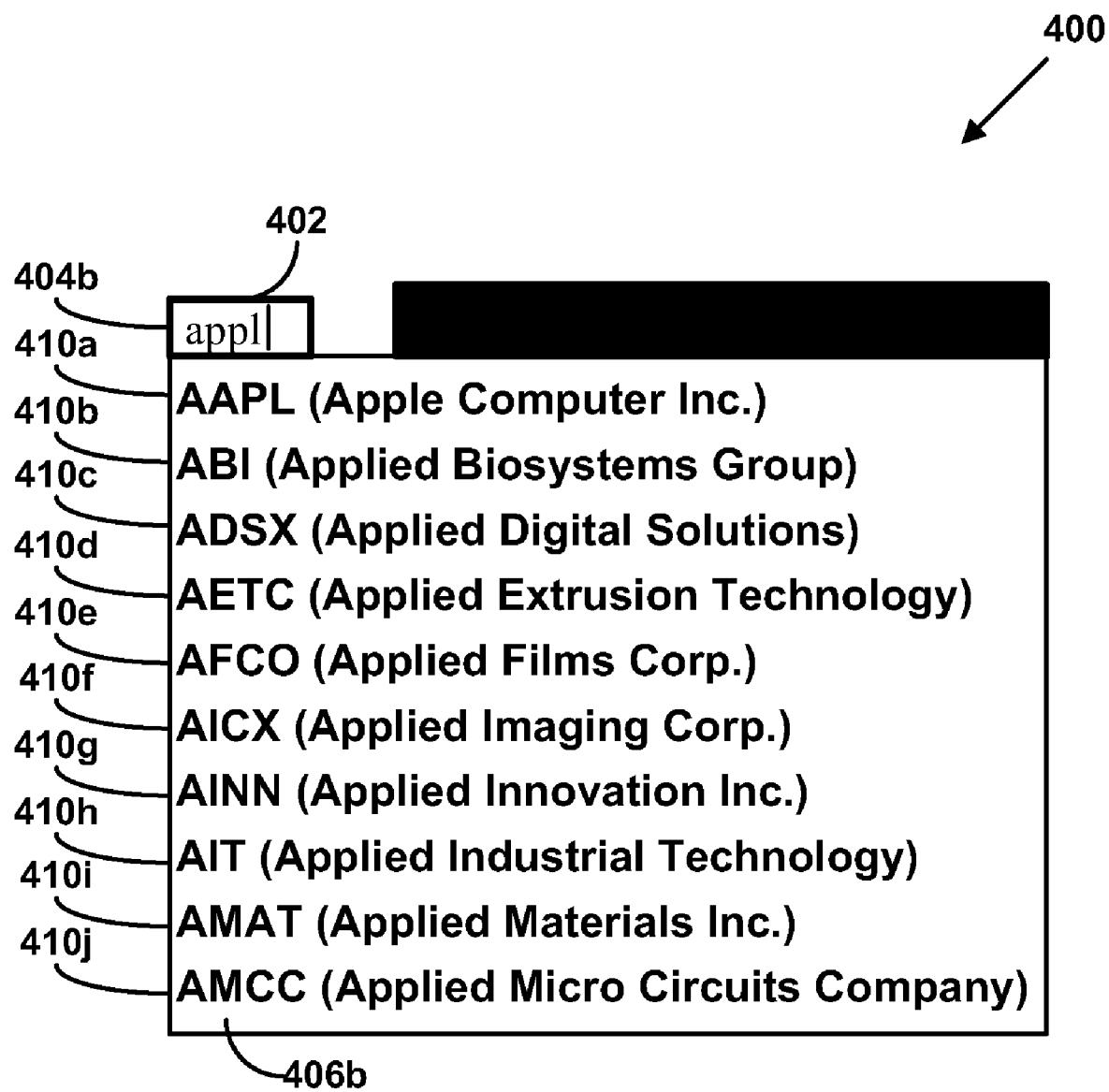

In the particular example illustrated in FIG. 4A, the text 404*a* typed by the user in the text input field 402 only matches stock ticker symbols in the set of stored tuples. Referring to FIG. 4B, an example is illustrated in which the text 404*b* ("appl") typed by the user matches company names (e.g., "Apple Computer Inc.", "Applied Biosystems Group", and "Applied Digital Solutions") instead of stock ticker symbols. The list 406*b* displayed in FIG. 4B, therefore, includes text 410*a-j* corresponding to tuples having company names that match the typed text 404*b*. Although the list 406*b* is sorted by stock ticker symbol, the list 406*b* may be organized in any manner. For example, the list 406*b* may be sorted by company name. Note that the list 406*b* displayed in FIG. 4B may be generated dynamically while the user types the text 404*b* in the same manner as described above with respect to the list 406*a* of FIG. 4A, namely by attempting to match the text 404*b* against both stock ticker symbols and company names.

Figure 4C:
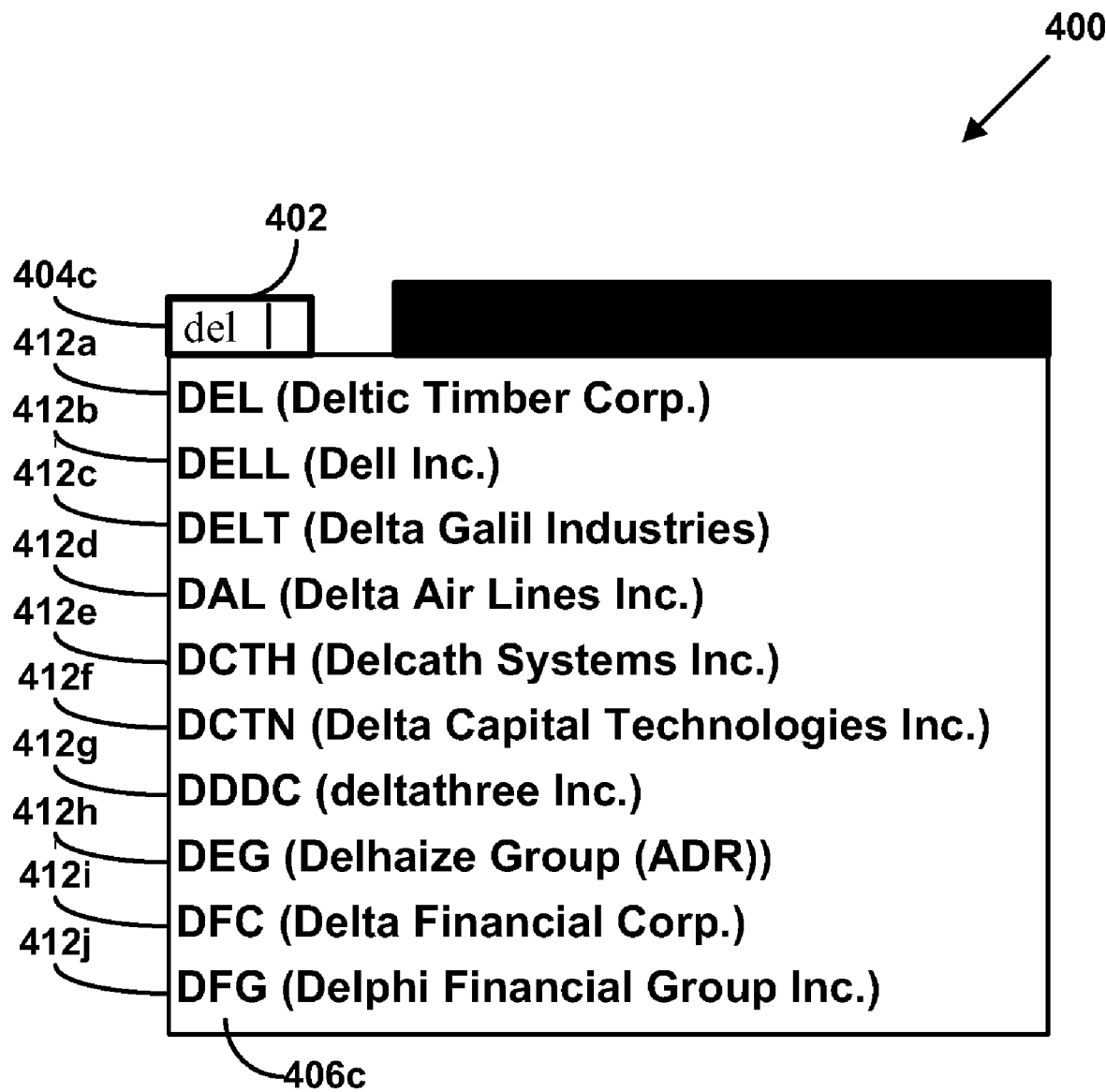

Referring to FIG. 4C, an example is illustrated in which the text 404*c* ("del") typed by the user matches both ticker symbols (i.e., "DEL", "DELL", and "DELT") and company names (i.e., "Delcath Systems Inc.", "Delta Capital Technologies Inc.", "deltathree Inc.", "Delhaize Group (ADR)", "Delta Financial Corp.", and "Delphi Financial Group Inc."). The list 406*c* displayed in FIG. 4C, therefore, includes both text 412*a-c* corresponding to tuples having ticker symbols that match the typed text 404*c* and text 412*d-j* having company names that match the typed text 404*c*. Although the list 406*c* includes two sections—one for matching ticker symbols and one for matching company names—the list may be organized in any manner. For example, the list 406*c* may be a single list sorted by company name or ticker symbol.

Once a list of matching tuples has been displayed (such as any of the lists 406*a-c* illustrated in FIGS. 4A-4C), the program may allow the user to select a tuple from the list to complete the text being typed in the text input field 402. For example, if the user clicks on an item in the list, the program may fill in the text field 402 with the stock ticker symbol of the tuple selected by the user. Note, however, that when the user selects a tuple from the list, the program may fill in the text field 402 with a stock ticker symbol even though the user had begun to type a company name, or vice versa. The user may also select more than one of the output strings by using the shift or control key while selecting a subset of the desired output strings.

The techniques disclosed herein may be used to reduce the number of keystrokes required to be input by the user. This may save the user effort and enable the user to use the corresponding computer program more quickly. For example, in comparison, conventional financial portal web sites typically provide a "symbol lookup" feature that allows a user to find the stock ticker symbol for a company by typing the company's name, and then clicking on a "find" button. Examples of existing financial portal web sites, some of which provide some form of "symbol lookup" feature, but which do not include the kind of lookup features disclosed herein, include: http://moneycentral.msn.com/investor/common/find.asp?NextPage=/detail/sto-ck quote, http://finance.yahoo.com/lookup, http://money.cnn.com/quote/lookup/index.html, http://www.marketwatch.com/tools/quotes/lookup.asp, http://clearstation.etrade.com/cgi-bin/symbol search, http://www.marketcenter.com/std/search.action, http://www.marketcenter.com/std/toolbox.jsp, http://www.quote.com/qc/lookup/symbol search.aspx, http://www.wallstreettape.com/charts/custom/symbol-lookup.asp, http://online.wsj.com/public/us, http://online.barrons.com/public/main, http://bigcharts.marketwatch.com/symbollookup/symbol-lookup.asp, http://www.esignalcentral.com/support/symbol/default.asp, http://www.hoovers.com/free/, http://www.bloomberg.com/apps/tkrlookup, http://www2.barchart.com/lookup.asp, http://stockcharts.com/index.html, http://tools.thestreet.com/tsc/quotes.html?pg=qcn&, http://www.earningswhispers.com/tickerlookup.asp, http://www.whispernumber.com/index.jsp, http://www.google.com, http://quote.morningstar.com/TickerLookup.html, http://www.fool.com, http://www.siliconinvestor.com, http://www.investorshub.com, http://www.ragingbull.com, http://www.boardcentral.com, http://www.briefing.com/, http://www.newyorktimes.com, http://www.washingtonpost.com, http://www.boston.com, http://www.ft.com,
http://news.bbc.co.uk/, http://www.inc.com, http://www.forbes.com, http://www.fortune.com,
http://research.businessweek.com/ticker/create_ticker.asp, http://www.etrade.com,
http://www.ameritrade.com, http://www.schwab.com, http://www.scottrade.com,
http://www.sharebuilder.com, and http://www.vanguard.com, http://seekingalpha.com/,
http://portfolios.abcnews.go.com/guotes/getQuote, http://www.investorvillage.com/home.asp,
http://www.tickertech.com/cgi/?a=lookup, http://www.investors.com/symbol.asp,
http://www.cboe.com/DelayedQuote/Symbol.aspx,
http://personal.fidelity.com/research/stocks/content/stocksind ex.shtml?bar=c,
http://www.quicken.com/investments/tsl/, http://www.globeinvestor.com/static/hubs/lookup.html,
http://www.usatoday.com/money/search-tips.htm, http://stockhouse.com/, http://www.thelion.com/,
http://www.island.com/, http://www.zacks.com/,
http://www.troweprice.com/common/indexHtml3/0,0,htmlid=38,00.html,
http://www.amex.com/?href=/quickquote/SymbolLookup.jsp, http://www.nasdaq.com,
http://www.nyse.com/, http://www.londonstockexchange.com/en-gb/, http://www.euronext.com,
http://www.tsx.com/, http://www.asx.com.au/, http://www.advfn.com, http://www.mldirect.ml.com,
http://www.foxnews.com/business/index.html, http://www.quickandreilly.com/,
http://www.economist.com/index.html, http://www.kiplinger.com/, http://www.pennystock.com/,
http://www.wallstreetselect.com/, http://www.sec.gov/edgar.shtml, http://www.edgar-online.com/,
http://freeedgar.com/, http://www.thedeal.com, http://www.investools.com,
http://www.activetradermag.com/, http://www.traders.com/, and http://www.ipohome.com.

The techniques disclosed herein may also provide the user with a beneficial degree of flexibility. For example, the techniques disclosed herein provide the user with the flexibility to type either a stock ticker symbol or a company name, depending on the user's preference, or depending on which of the two the user remembers most easily. The user, therefore, is not limited to a particular mode of input dictated by the program. This may make the program easily usable by different classes of users, such as both those users who are sophisticated stock traders (and therefore likely to remember stock ticker symbols) and less sophisticated users (who are likely to remember company names rather than symbols). More generally, the techniques disclosed herein reduce the need for the user to rely on his memory to provide necessary textual input.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although certain examples described herein use stock ticker symbol and company name as the categories of text strings stored in n-tuples, the techniques disclosed herein may be applied to text strings representing any categories of content. For example, company sector (or other means of categorizing a company) is another example of a category of content to which the techniques disclosed herein may be applied.

Although particular examples disclosed herein involve the use of pairs of text strings, such pairs are merely special cases of n-tuples, in which n=2. The techniques disclosed herein may be applied more generally, to n-tuples where n>1. Furthermore, the text in the tuples may be of any kind and have any relationship to each other. For example, although stock ticker symbols typically have some textual similarity to the corresponding company names, this is not required. For example, an n-tuple may include a person's name and the person's street address, in which case there may be no textual similarity between the various text strings in the n-tuple.

In certain examples disclosed herein, the text typed by the user is matched against the beginning (leading characters) of text in the n-tuples. This is not, however, a requirement of the present invention. Rather, matching may be performed by comparing any subset of the text typed by the user against any subset of the n-tuple text. Furthermore, matching need not be performed against all elements in an n-tuple, or in the same manner against all elements in an n-tuple. For example, if n=3, matching may be performed against two rather than three of the text strings in the n-tuple.

Although certain examples disclosed herein provide the user with an indication of matches by displaying a list of all text in matching n-tuples, this is not a requirement of the present invention. Rather, matches may be displayed in a form other than a list. Furthermore, displayed matches need not display all of the text in matching tuples. The user may be allowed to select a matching tuple using any kind of input mechanism.

Any kind of computer program may implement the techniques disclosed herein. For example, the techniques disclosed herein may be implemented in a web site displayed by a web browser.

Although the concept of an n-tuple is used herein, the techniques disclosed herein may be implemented without storing data in structures organized as n-tuples. Rather, the techniques disclosed herein may be implemented using any kind of data structure, such as linked lists. The data against which the user input is matched may be pre-stored, downloaded over a network connection, generated on-the-fly, or produced, stored, and processed in any suitable manner.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

A computer program provides a first set of representations (e.g., textual representations) of a first set of hyperlinks. In response to selection by a user of one of the first set of hyperlink representations (such as by clicking on or hovering a cursor over the representation), the program displays a second set of representations (e.g., graphical representations) of a second set of hyperlinks. The user may select one of the second set of representations, in response to which the program navigates to the destination of the hyperlink. The second set of representations may, for example, be logos of companies, and the second set of hyperlinks may be hyperlinks to the companies' web sites.

Figure 5A:
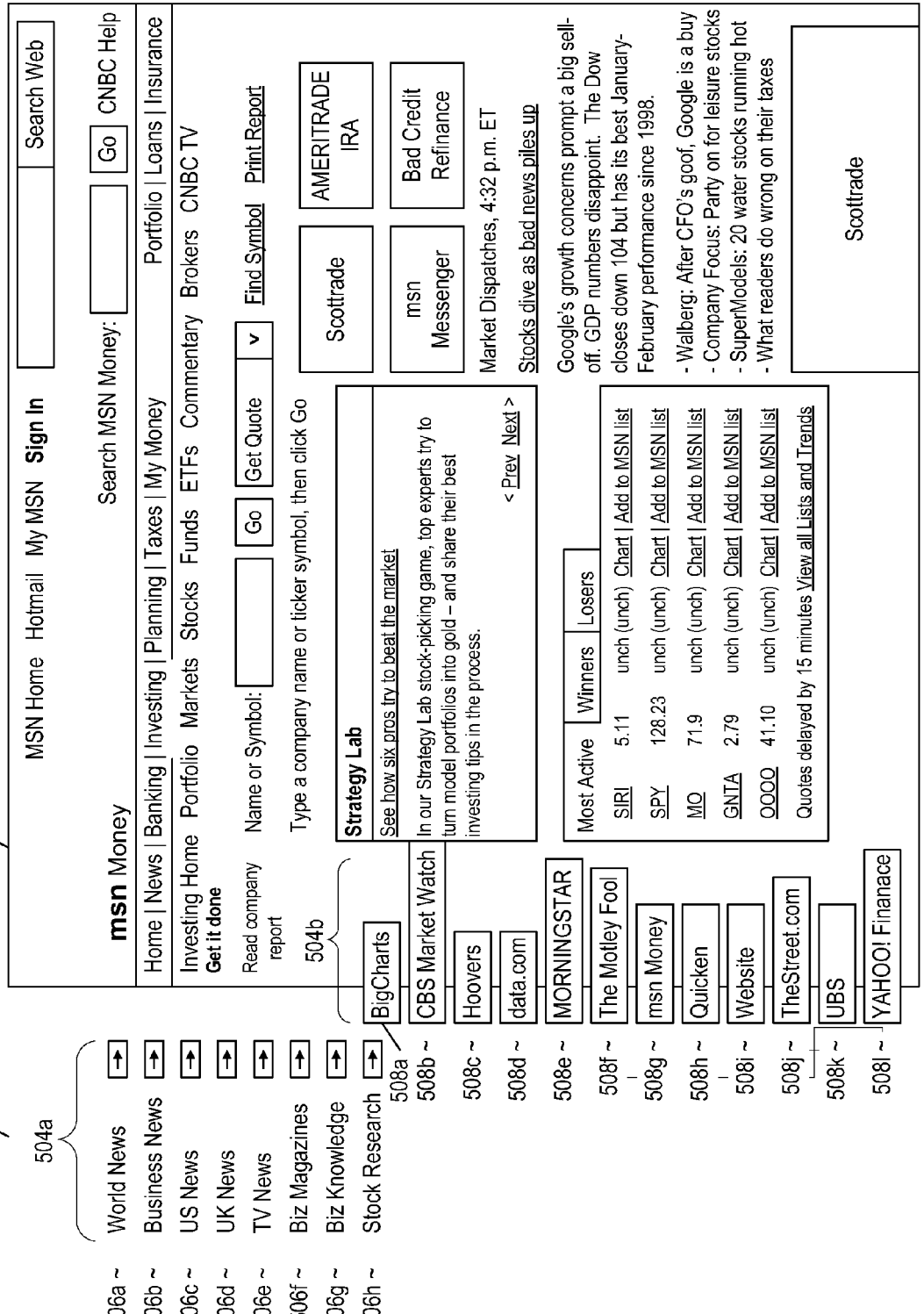
FIGS. 5A-5B are illustrations of web page hyperlinks displayed by embodiments of the present invention.

For example, referring to FIG. 5A, a web page 500 is shown according to one embodiment of the present invention. The web page 500 includes a first frame 502a displaying a first set of textual hyperlink representations 504a, and a second frame 502b displaying the contents of another web page.

In the embodiment illustrated in FIG. 5A, the first set of hyperlink representations 504a includes hypertext 506a-h. In this example, the hypertext 506a-h includes text representing categories of news web sites. For example, hypertext 506a ("World News") represents the category of world news web sites, hypertext 506b ("Business News") represents the category of business news web sites, and so on. The particular number, selection, and categorization of hypertext 506a-h shown in FIG. 5A is provided merely as an example and does not constitute a limitation of the present invention.

The hyperlink representations 504a enable the user to access the underlying hyperlinks to external websites by hovering over selecting any of the hypertext 506a-h. The user may, for example, select a particular link either by clicking on one of the hypertext links 506a-h or by hovering a mouse cursor over one of the hypertext links 506a-h.

In response to receiving a selection of one of the hypertext links 506a-h from the user, the web page 500 displays a second set of hyperlink representations 504b. In the particular example illustrated in FIG. 5A, the user has clicked on or hovered the mouse cursor over hypertext 506h ("Stock Research"). In response, the web page 500 has displayed the second set of hyperlink representations 504b, which represent hyperlinks within the selected category. In other words, each of the hyperlink representations 508a-l represents a hyperlink to a stock research web site.

More specifically, in the embodiment illustrated in FIG. 5A, each of the hyperlink representations 508a-l is a graphic image of the logo of the web site that is the destination of the hyperlink. For example, hyperlink representation 508a is the logo of www.bigcharts.com, and the hyperlink representation 508a acts as a link to www.bigcharts.com.

Therefore, when the user selects (e.g., clicks on or hovers over) one of the second set of hyperlink representations 508a-l, the web browser displays the destination of the selected hyperlink in the frame 502b. For example, if the user selects hyperlink representation 508a (i.e., the logo of www.bigcharts.com), the web browser will navigate to and display the home page of www.bigcharts.com in frame 502b.

Figure 5B:

Different sets of hyperlinks are displayed as the user selects (e.g., clicks on or hovers over) different ones of the first set of hyperlinks 506a-h. For example, as shown in FIG. 5B, when the user selects hyperlink 506d ("UK News"), the web page 500 displays a set 504c of hyperlink representations 510a-j depicting logos of UK news web sites. If hovering is enabled to activate the first set 504a of links 506a-h, the user may quickly view the links in different categories by moving the mouse cursor over different ones of the first set 504a of links 506a-h. In a web browser, such a feature may be enabled using AJAX technology, through which all of the logos may be pre-downloaded with the web page 500, and then quickly displayed to the user without requiring additional accesses to the server.

The techniques just described may, for example, be implemented in conjunction with a message board aggregation web site of the kind disclosed in the patent application entitled, "Message Board Aggregator", now issued under U.S. Pat. No. 7,529,795.

One advantage of the techniques disclosed herein is that hyperlink representations (e.g., the hyperlinks 504b and 504c) may be displayed to the user essentially instantaneously. Such techniques, therefore, provide the user with a method of scanning through links that is more intuitive and thus quicker for users than traditional techniques. Furthermore, the use of company logos or other graphical representations of hyperlinks facilitates the users experience, because it is likely that the user will already associate the company logo with the corresponding company name (attached to the hyperlink). The method is also visually more appealing than commonly used plain text methods.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. In particular, the functions performed by the aggregation server 112 shown in FIG. 1 may be further subdivided into additional components for performing the same functions.

The first set of hyperlinks 504a may be sorted into categories, sub-categories, and so on, in any manner. Alternatively, they may be unsorted. The hyperlinks that are displayed may be predetermined by the web page designer, determined by the user, or any combination thereof. The user may, for example, be provided with the ability to set up categories (and subcategories) comprising favorite website hyperlinks.

Any kind of computer program may implement the techniques disclosed herein. For example, the techniques disclosed herein may be implemented in a web site displayed by a web browser.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer program product embodied on a non-transitory computer readable medium, comprising:
   computer code for causing display of a first set of representations of a first set of hyperlinks in connection with a page that includes a second set of representations of a second set of hyperlinks that are pre-downloaded with the page;
   computer code for allowing receipt of a first input from a user indicating a selection of one of the first set of hyperlink representations;
   computer code for causing, in response to the receiving the first input, display of the second set of representations of the second set of hyperlinks that are pre-downloaded with the page such that the second set of representations of the second set of hyperlinks are displayed without requiring an additional access to a server;
   computer code for allowing receipt of a second input from the user indicating a selection of one of the second set of hyperlink representations;
   computer code for causing, in response to receiving the second input, navigation to a destination specified by the selected one of the second set of hyperlink representations;
   computer code for causing display of a list of topics;
   computer code for allowing receipt of a selection of a first topic from the list of topics;
   computer code for, after the selection of the first topic:
      causing display of, in a first portion of a window of a computer program, particular content representing at least a portion of a particular message associated with the first topic,
      causing display of, in a second portion of the window of the computer program and contemporaneously with the particular content, a first message summary including first information associated with a first message associated with the first topic, wherein the computer program product includes an application program capable of being operable on a mobile device and is further operable such that a first message content associated with the first message is preloaded and the first message content associated with the first message is initially hidden after being preloaded,
      causing display of, in the second portion of the window of the computer program and contemporaneously with the particular content, a second message summary including second information associated with a second message associated with the first topic, wherein the computer program product is operable such that a second message content associated with the second message is preloaded and the second message content associated with the second message is initially hidden after being preloaded,
      allowing receipt of a first user interaction in association with the first message summary,
      causing display of, in response to the first user interaction, the first message content associated with the first message, utilizing the first portion of the window of the computer program,
      allowing receipt of a second user interaction in association with the second message summary, and
      causing display of, in response to the second user interaction, the second message content associated with the second message, utilizing the first portion of the window of the computer program;
   computer code for allowing receipt of a selection of a second topic from the list of topics; and
   computer code for, after the selection of the second topic:
      causing display of, in the first portion of the window of the computer program, another particular content representing at least a portion of another particular message associated with the second topic,
      causing display of, in the second portion of the window of the computer program and contemporaneously with the another particular content, a third message summary including third information associated with a third message associated with the second topic, wherein the computer program product is operable such that a third message content associated with the third message is preloaded and the third message content associated with the third message is initially hidden after being preloaded,
      causing display of, in the second portion of the window of the computer program and contemporaneously with the another particular content, a fourth message summary including fourth information associated with a fourth message associated with the second topic, wherein the computer program product is operable such that a fourth message content associated with the fourth message is preloaded and the fourth message content associated with the fourth message is initially hidden after being preloaded, allowing receipt of a third user interaction in association with the third message summary, causing display of, in response to the third user interaction, the third message content associated with the third message, utilizing the first portion of the window of the computer program, allowing receipt of a fourth user interaction in association with the fourth message summary, and causing display of, in response to the fourth user interaction, the fourth message content associated with the fourth message, utilizing the first portion of the window of the computer program.

2. A computer program product embodied on a non-transitory computer readable medium, comprising:

computer code for causing display of a list of topics;

computer code for allowing receipt of a selection of a first topic from the list of topics;

computer code for, after the selection of the first topic:

causing display of, in a first portion of a window of a computer program, particular content representing at least a portion of a particular message associated with the first topic, causing display of, in a second portion of the window of the computer program and contemporaneously with the particular content, a first message summary including first information associated with a first message associated with the first topic, wherein the computer program product includes an application program capable of being operable on a mobile device and is further operable such that a first message content associated with the first message is preloaded and the first message content associated with the first message is initially hidden after being preloaded, causing display of, in the second portion of the window of the computer program and contemporaneously with the particular content, a second message summary including second information associated with a second message associated with the first topic, wherein the computer program product is operable such that a second message content associated with the second message is preloaded and the second message content associated with the second message is initially hidden after being preloaded, allowing receipt of a first user interaction in association with the first message summary, causing display of, in response to the first user interaction, the first message content associated with the first message, utilizing the first portion of the window of the computer program, allowing receipt of a second user interaction in association with the second message summary, and causing display of, in response to the second user interaction, the second message content associated with the second message, utilizing the first portion of the window of the computer program;

computer code for allowing receipt of a selection of a second topic from the list of topics; and computer code for, after the selection of the second topic:

causing display of, in the first portion of the window of the computer program, another particular content representing at least a portion of another particular message associated with the second topic, causing display of, in the second portion of the window of the computer program and contemporaneously with the another particular content, a third message summary including third information associated with a third message associated with the second topic, wherein the computer program product is operable such that a third message content associated with the third message is preloaded and the third message content associated with the third message is initially hidden after being preloaded, causing display of, in the second portion of the window of the computer program and contemporaneously with the another particular content, a fourth message summary including fourth information associated with a fourth message associated with the second topic, wherein the computer program product is operable such that a fourth message content associated with the fourth message is preloaded and the fourth message content associated with the fourth message is initially hidden after being preloaded, allowing receipt of a third user interaction in association with the third message summary, causing display of, in response to the third user interaction, the third message content associated with the third message, utilizing the first portion of the window of the computer program, allowing receipt of a fourth user interaction in association with the fourth message summary, and causing display of, in response to the fourth user interaction, the fourth message content associated with the fourth message, utilizing the first portion of the window of the computer program.

3. The computer program product of claim 2, wherein the computer program product is operable such that a user is capable of causing posting of at least one new message in association with at least one of the first message, the second message, the third message, or the fourth message, to both:

a first online forum, and a second online forum different from the first online forum.

4. The computer program product of claim 3, wherein:

at least one of the first message, the second message, the third message, or the fourth message is associated with a first online forum and at least one of the first message, the second message, the third message, or the fourth message is associated with a second online forum different than the first online forum;

the application program includes a web browser;

each of the displaying is carried out utilizing web pages;

the first portion and the second portion are separate, non-overlapping portions;

the first portion of the window includes a first frame and the second portion of the window includes a second frame;

the first message summary and the second message summary are displayed in a table;

the topics are each associated with a different forum;

the preloading occurs in response to the selection of the topics;

the first topic includes a sports topic and the second topic includes a business-related topic;

the list of topics is displayed utilizing a drop down menu;

the first message summary includes a first title and the second message summary includes a second title;

the particular message includes a default message;

the interactions include clicks;

the window includes a rectangular interface for allowing interaction with the user; and the first message content, the second message content, the third message content, and the fourth message content each include only partial content.

5. The computer program product of claim 2, wherein the computer program product is operable such that advertisements are displayed with each of the first message content, the second message content, the third message content, and the fourth message content.

6. A computer program product embodied on a non-transitory computer readable medium, comprising:
   computer code for causing display of a list of topics related to news;
   computer code for allowing receipt of a selection of a first topic from the list of topics;
   computer code for, after the selection of the first topic:
      causing display of, in a first portion of a window of a computer program, particular content representing at least a portion of a particular message associated with the first topic,
      causing display of, in a second portion of the window of the computer program and contemporaneously with the particular content, a first message summary including first information associated with a first message associated with the first topic, wherein the computer program product includes an application program capable of being operable on a mobile device and is further operable such that a first message content associated with the first message is preloaded and the first message content associated with the first message is initially hidden after being preloaded,
      causing display of, in the second portion of the window of the computer program and contemporaneously with the particular content, a second message summary including second information associated with a second message associated with the first topic, wherein the computer program product is operable such that a second message content associated with the second message is preloaded and the second message content associated with the second message is initially hidden after being preloaded,
      allowing receipt of a first user interaction in association with the first message summary,
      causing display of, in response to the first user interaction, the first message content associated with the first message, utilizing the first portion of the window of the computer program,
      allowing receipt of a second user interaction in association with the second message summary, and
      causing display of, in response to the second user interaction, the second message content associated with the second message, utilizing the first portion of the window of the computer program;
   computer code for allowing receipt of a selection of a second topic from the list of topics; and
   computer code for, after the selection of the second topic:
      causing display of, in the first portion of the window of the computer program, another particular content representing at least a portion of another particular message associated with the second topic,
      causing display of, in the second portion of the window of the computer program and contemporaneously with the another particular content, a third message summary including third information associated with a third message associated with the second topic, wherein the computer program product is operable such that a third message content associated with the third message is preloaded and the third message content associated with the third message is initially hidden after being preloaded,
      causing display of, in the second portion of the window of the computer program and contemporaneously with the another particular content, a fourth message summary including fourth information associated with a fourth message associated with the second topic, wherein the computer program product is operable such that a fourth message content associated with the fourth message is preloaded and the fourth message content associated with the fourth message is initially hidden after being preloaded,
      allowing receipt of a third user interaction in association with the third message summary,
      causing display of, in response to the third user interaction, the third message content associated with the third message, utilizing the first portion of the window of the computer program,
      allowing receipt of a fourth user interaction in association with the fourth message summary,
      causing display of, in response to the fourth user interaction, the fourth message content associated with the fourth message, utilizing the first portion of the window of the computer program;
   wherein the computer program product is operable such that a user is capable of causing posting of at least one new message in association with at least one of the first message, the second message, the third message, or the fourth message, to both:
      a first online forum, and
      a second online forum different from the first online forum;
   wherein the computer program product is further operable such that advertisements are displayed with each of the first message content, the second message content, the third message content, and the fourth message content.

* * * * *